(12) United States Patent
Fick et al.

(10) Patent No.: US 8,853,894 B2
(45) Date of Patent: Oct. 7, 2014

(54) CYLINDRICAL LINEAR MOTOR HAVING LOW COGGING FORCES

(75) Inventors: Michael Fick, Sondernau (DE); Armin Stäblein, Fladungen (DE); Rolf Vollmer, Gersfeld (DE)

(73) Assignee: Siemens Aktiengesellschaft, München (DE)

( * ) Notice: Subject to any disclaimer, the term of this patent is extended or adjusted under 35 U.S.C. 154(b) by 330 days.

(21) Appl. No.: 13/469,263

(22) Filed: May 11, 2012

(65) Prior Publication Data

US 2013/0127265 A1    May 23, 2013

(30) Foreign Application Priority Data

May 13, 2011 (EP) .................................... 11166056

(51) Int. Cl.
*H02K 41/03* (2006.01)
*H02K 3/28* (2006.01)
*H02K 16/00* (2006.01)

(52) U.S. Cl.
CPC ............... *H02K 16/00* (2013.01); *H02K 41/03* (2013.01); *H02K 3/28* (2013.01); *H02K 41/031* (2013.01)
USPC .................. 310/12.22; 310/12.14; 310/12.21

(58) Field of Classification Search
CPC . H02K 41/03; H02K 41/031; H02K 2213/03; H02K 3/28
USPC ....................... 310/12.14, 12.18, 12.21, 12.22
See application file for complete search history.

(56) References Cited

U.S. PATENT DOCUMENTS

| | | | |
|---|---|---|---|
| 5,298,819 A * | 3/1994 | Suganuma et al. | 310/12.22 |
| 5,365,131 A * | 11/1994 | Naito et al. | 310/12.22 |
| 6,483,221 B1 | 11/2002 | Pawellek et al. | |
| 6,628,031 B2 | 9/2003 | Vollmer | |
| 6,768,238 B2 | 7/2004 | Knauff et al. | |
| 6,812,612 B2 | 11/2004 | Schunk et al. | |
| 6,858,965 B2 | 2/2005 | Muller et al. | |
| 6,885,187 B2 | 4/2005 | Duenisch et al. | |
| 6,943,467 B2 | 9/2005 | Potoradi et al. | |
| 7,141,905 B2 | 11/2006 | Vollmer | |
| 7,285,883 B2 | 10/2007 | Bott et al. | |
| 7,564,158 B2 | 7/2009 | Huth et al. | |
| 7,705,507 B2 | 4/2010 | Vollmer | |
| 7,709,984 B2 | 5/2010 | Braun et al. | |
| 7,732,967 B2 | 6/2010 | Schunk et al. | |
| 7,755,315 B2 | 7/2010 | Bott et al. | |
| 7,777,373 B2 | 8/2010 | Bott et al. | |
| 7,859,160 B2 | 12/2010 | Vollmer | |

(Continued)

FOREIGN PATENT DOCUMENTS

| | | | |
|---|---|---|---|
| DE | 10 2005 020 504 A1 | 11/2006 | |
| JP | 2006223090 A | 8/2006 | |
| WO | WO 2006117335 A1 * | 11/2006 | |

*Primary Examiner* — Burton Mullins
*Assistant Examiner* — Eric Johnson
(74) *Attorney, Agent, or Firm* — Henry M Feiereisen LLC

(57) ABSTRACT

Cogging forces of a cylindrical linear motor are reduced with a linear motor having a rotor with eight poles and a stator with 36 toroidal coils (optionally multiples of eighteen toroidal coils) inserted into slots (N1 to N36) (or a multiple of 36 slots). The toroidal coils extend in the circumferential direction of the stator, are of equal size, and are arranged axially one behind the other. All the terminals of the toroidal coils are located in an axially extending connector channel. The two terminals of each coil are connected according to a specific connection scheme.

16 Claims, 4 Drawing Sheets

(56) References Cited

U.S. PATENT DOCUMENTS

| | | |
|---|---|---|
| 7,915,777 B2 | 3/2011 | Vollmer |
| 8,026,640 B2 | 9/2011 | Bott et al. |
| 8,035,371 B2 | 10/2011 | Budde et al. |
| 2006/0219880 A1 | 10/2006 | Braun et al. |
| 2007/0040466 A1 | 2/2007 | Vollmer |
| 2007/0114861 A1 | 5/2007 | Bott et al. |
| 2007/0257566 A1 | 11/2007 | Vollmer |
| 2007/0257575 A1 | 11/2007 | Vollmer |
| 2008/0169718 A1 | 7/2008 | Bott et al. |
| 2008/0185931 A1 | 8/2008 | Platen et al. |
| 2008/0289440 A1 | 11/2008 | Denk et al. |
| 2008/0315704 A1 | 12/2008 | Vollmer |
| 2009/0009114 A1 | 1/2009 | Schunk et al. |
| 2009/0015080 A1 | 1/2009 | Vollmer et al. |
| 2009/0072634 A1 | 3/2009 | Vollmer |
| 2009/0152959 A1 | 6/2009 | Vollmer |
| 2009/0152976 A1 | 6/2009 | Bott et al. |
| 2009/0160283 A1 | 6/2009 | Bott et al. |
| 2009/0184602 A1 | 7/2009 | Braun et al. |
| 2009/0251013 A1 | 10/2009 | Vollmer |
| 2009/0315424 A1 | 12/2009 | Vollmer |
| 2009/0322174 A1 | 12/2009 | Grossmann et al. |
| 2010/0000830 A1 | 1/2010 | Budde et al. |
| 2010/0013332 A1 | 1/2010 | Vollmer |
| 2010/0013333 A1 | 1/2010 | Vollmer |
| 2010/0133940 A1 | 6/2010 | Grossmann et al. |
| 2010/0264770 A1 | 10/2010 | Braun et al. |
| 2011/0006617 A1 | 1/2011 | Budde et al. |

* cited by examiner

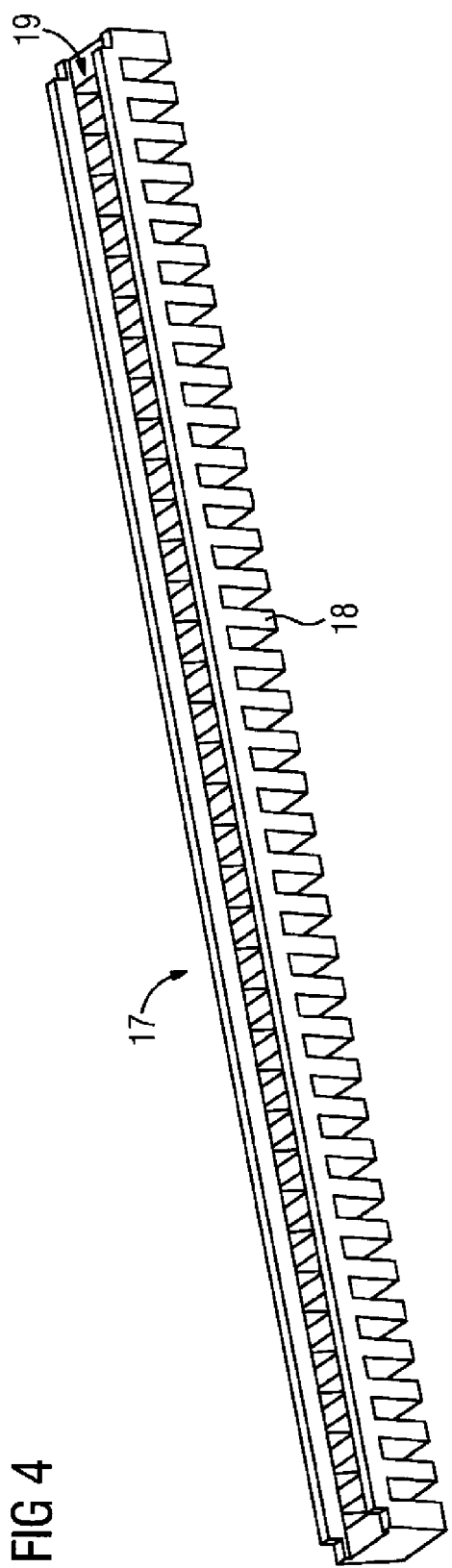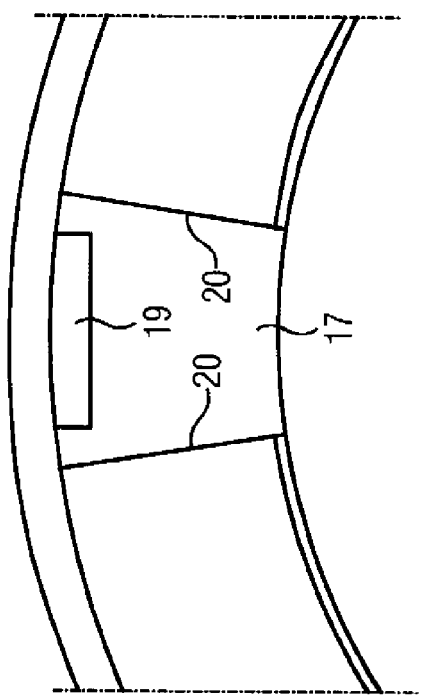
FIG 4
FIG 5

CYLINDRICAL LINEAR MOTOR HAVING LOW COGGING FORCES

CROSS-REFERENCES TO RELATED APPLICATIONS

This application claims the priority of European Patent Application EP11166056.9, filed May 13, 2011, pursuant to 35 U.S.C. 119(a)-(d), the content of which is incorporated herein by reference in its entirety as if fully set forth herein.

BACKGROUND OF THE INVENTION

The present invention relates to a cylindrical linear motor having a cylindrical rotor that has eight poles and further having a cylindrical stator with a winding made of 36 toroidal coils that extend in the circumferential direction.

The following discussion of related art is provided to assist the reader in understanding the advantages of the invention, and is not to be construed as an admission that this related art is prior art to this invention.

Linear motors can have a cylindrical design. The stator core is therein embodied hollow-cylindrically and on its inside has slots extending in the circumferential direction. Inserted into said slots are toroidal coils. The stator core is usually made from a solid, magnetically soft material.

The rotors of the linear motors are typically fitted on their surface with permanent magnets. The stators of the linear motors dynamically form the magnetic poles in the axial direction. The rotor and stator will then attract each other with different forces depending on the axial position. This produces in part high cogging forces which are undesirable in linear motors.

Combination drives are employed for drive functions requiring a rotating and linear motion. Advantageously, angle and travel of these motions can be freely and mutually independently set. There motions must frequently be performed highly dynamically.

It would therefore be desirable and advantageous to obviate prior art shortcomings and to provide an improved cylindrical linear motor having very low cogging forces.

SUMMARY OF THE INVENTION

According to one aspect of the present invention, a cylindrical linear motor includes a cylindrical rotor with eight poles, and a cylindrical stator with a winding having 36 toroidal coils extending in the circumferential direction. The toroidal coils are of equal size and arranged axially one behind the other. All terminals of the toroidal coils are located in an axially extending connector channel. Each toroidal coil has a left-hand terminal and a right-hand terminal when viewed from the top onto the connector channel, resulting in left-hand terminals A1L to A36L and right-hand terminals A1R to A36R for the 36 toroidal coils. The terminals are connected in pairs as follows:

| | | |
|---|---|---|
| A1L to A6R    | A3L to A5L    | A2R to A4R |
| A4L to A9R    | A6L to A8L    | A5R to A7R |
| A7L to A12R   | A9L to A11L   | A8R to A10R |
| A10L to A15R  | A12L to A14L  | A11R to A13R |
| A13L to A18R  | A15L to A17L  | A14R to A16R |
| A16L to A21R  | A18L to A20L  | A17R to A19R |
| A19L to A24R  | A21L to A23L  | A20R to A22R |
| A22L to A27R  | A24L to A26L  | A23R to A25R |
| A25L to A30R  | A27L to A29L  | A26R to A28R |
| A28L to A33R  | A30L to A32L  | A29R to A31R |
| A31L to A36R  | A33L to A35L  | A32R to A34R. |

In addition, the terminals A2L, A1R, and A3R are each connected to a corresponding phase of a three-phase system, whereas the terminals A34L, A36L, and A35R are connected together at a star point.

The pair-wise connection of the 36 left-hand terminals and the 36 right-hand terminals may also be expressed with the following relationships:

$A(n*3+1)L$ to $A(n*3+6)R,$ $A(n*3+3)L$ to $A(n*3+5)L,$ $A(n*3+2)R$ to $A(n*3+4)R,$ wherein $A(i)L$ indicates the i-th left-hand terminals, $A(i)R$ indicates the i-th right-hand terminals, and $n=0 \ldots 10$ for all terminals.

The three phases of a three-phase system are advantageously applied to the toroidal of the stator coils so as to produce only extremely low cogging forces for the rotor having the eight poles and the stator having the 36 toroidal coils. That is achieved in particular by energizing the individual coils in the respective direction with the different phases in keeping with the above scheme.

According to an advantageous feature of the present invention, the stator may be extended in its center by a number of additional toroidal coils forming so-called basic windings, wherein each basic winding has eighteen toroidal coils or a multiple thereof, with the terminals of the additional toroidal coils being connected according to the same scheme as in the aforedescribed central part of the non-extended stator.

According to an advantageous feature of the present invention, laminating the stator core reduces the eddy currents in the stator core or the stator iron and therefore also minimizes losses. Commensurately less field displacement will moreover occur so that a faster force build-up will be possible.

According to another advantageous feature of the present invention, the stator may have a magnetically soft stator core having slots that extend in the circumferential direction and into which the toroidal coils are inserted. The toroidal coils are therefore fixed into position and the respective magnetic field is guided into the air gap between the rotor and stator.

Advantageously, the individual plates of the stator core may form a plate arrangement which may have one or more interruptions in the tangential or, as the case may be, circumferential direction, into each of which a stator-comb element is inserted. The terminals of the windings can be routed to the outside in said stator-comb element and connected.

According to an advantageous feature of the present invention, the stator-comb element may have an axially extending channel in which the connecting means of the toroidal coils may be located. The comb element may hence be used also for accommodating connecting elements for connecting the windings and for fixing said elements into position.

According to another advantageous feature of the present invention, the stator-comb element may have an electrically insulating plastic part, an electrically insulated cast part, or an electrically insulated sintered part. Materials of this type can ensure that the connections of the windings can be safely accommodated on the stator.

According to yet another advantageous feature of the present invention, the connections at the terminals may be produced using insulation-displacement connectors or solder joints. Connections of such kind can be quickly produced and have proven to be stable.

According to an advantageous feature of the present invention, the above-described cylindrical linear motor may be employed for a combination drive. The advantages of low cogging forces can hence be used also for drives capable of performing rotational and stroke motions.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 4 shows a stator-comb element;

FIG. 5 is a front-side view of a part of the stator shown in FIG. 3 in the region of the stator-comb element.

DETAILED DESCRIPTION OF PREFERRED EMBODIMENTS

Figure 1:
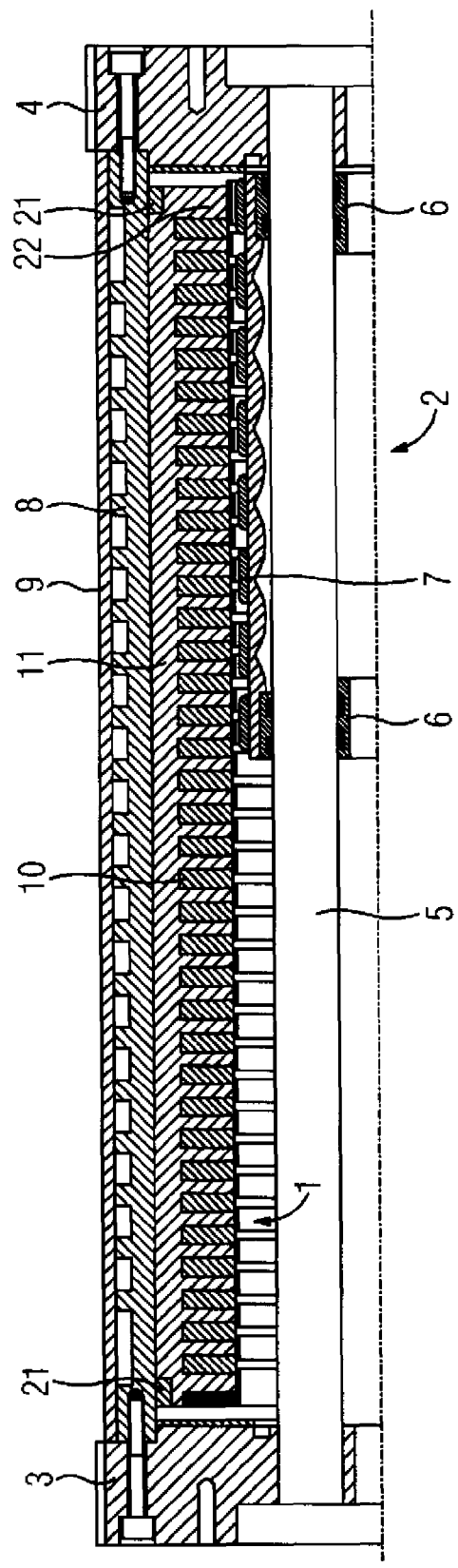
FIG. 1 is a cross-section through a part of a cylindrical linear motor according to the present invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Figure 3:
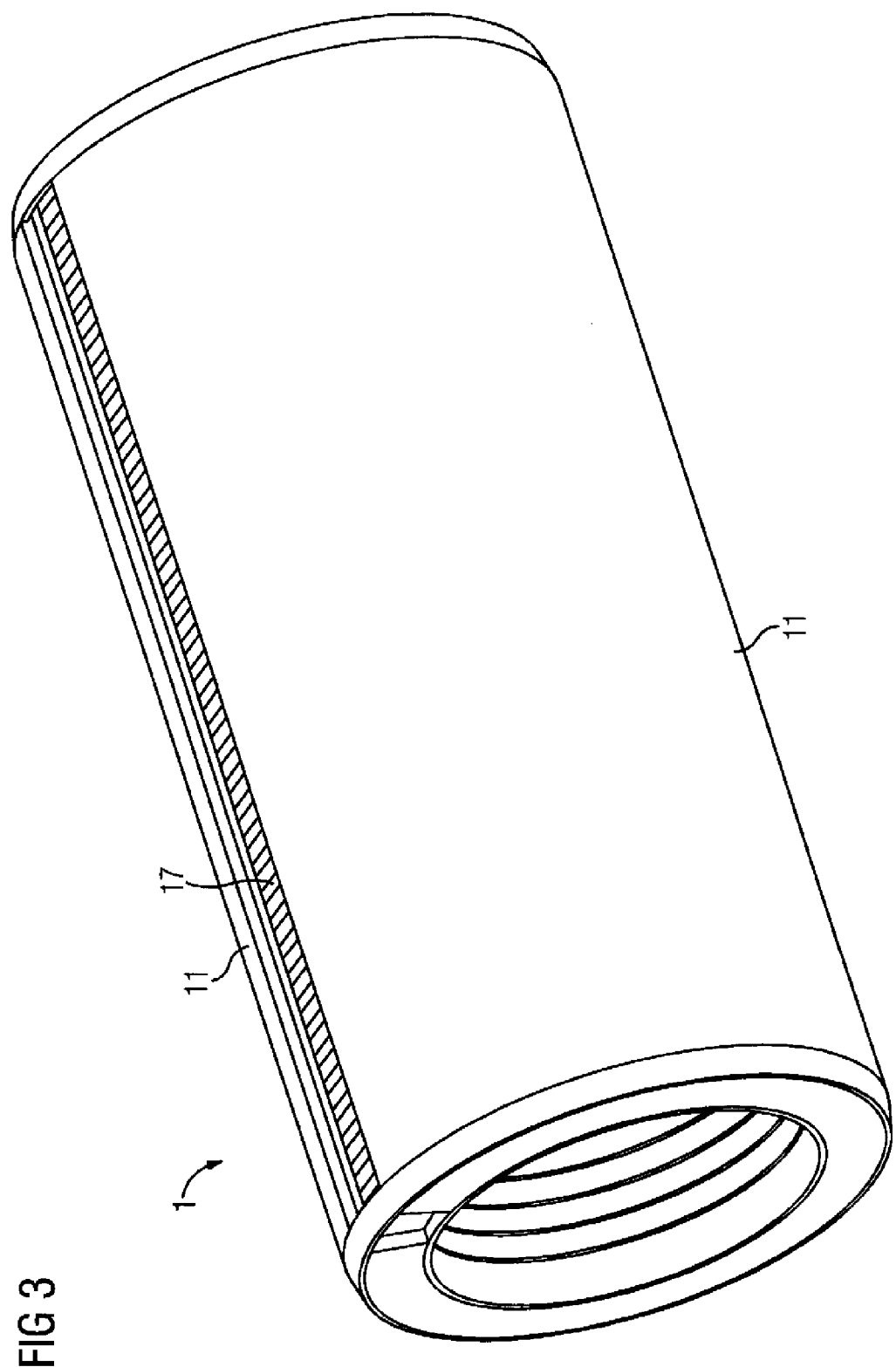
FIG. 3 is an oblique view of a stator of an inventive cylindrical linear motor.

Turning now to the drawing, and in particular to FIG. 1, there is shown a cross-section through a part of a cylindrical linear motor whose stator 1 is cylindrical and is shown once more in FIG. 3 in a perspective view. Located coaxially in cylindrical stator 1 is a likewise cylindrical rotor 2. End shields 3, 4 are located on the front sides of stator 1. A guide rod 5 for rotor 2 is secured in end shields 3, 4 parallel to the cylindrical linear motor's axis. One or more further guide rods 5 of such kind are fixed into position in end shields 3, 4 for guiding rotor 2. Rotor 2 is supported linearly on guide rod(s) 5 by means of guide bushes 6. Located on its outer surface is a plurality of permanent magnets 7 distributed in the axial and circumferential direction.

Stator 1 is externally surrounded by a cooling jacket 8. The cooling jacket 8 forms, together with a housing 9 which in turn surrounds ribbed cooling jacket 8, a plurality of cooling channels in which, for example, water for cooling the linear motor flows. End shields 3, 4 are secured, for example screwed into position, on cooling jacket 8 or, as the case may be, housing 9.

Stator 1 has a plurality of toroidal coils 10 each extending in the circumferential direction of cylindrical stator 1. They have been inserted into corresponding slots in stator core 11. The slots extend likewise in the circumferential direction. The stator core is usually formed from a ferromagnetic material and concentrates the magnetic flux of toroidal coils 10.

Figure 2:
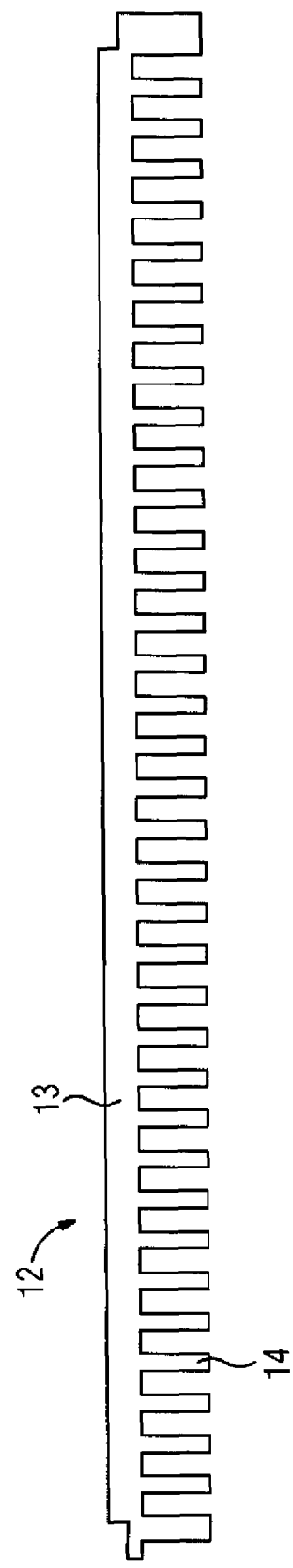
FIG. 2 shows a stator plate of the cylindrical linear motor shown in FIG. 1.

Stator core 11 is optionally laminated. It has a plurality of individual plates 12 which according to FIG. 2 are comb-shaped in structure. Individual plates 12 each extend in the cylindrical linear motor's axial direction. One individual plate 12 has an axial length of the stator core or a plurality of individual plates 12 are arranged one behind the other. Individual plates 12 are arranged in a star formation or, as the case may be, radially in the circumferential direction of cylindrical stator 1. That produces a cylindrical plate arrangement or, as the case may be, a cylindrical plate packet.

Each individual plate 12 has an axially extending yoke 13 from which a plurality of teeth 14 project perpendicularly. Teeth 14 point radially inward in the installed condition and form the walls of the slots for toroidal coils 10.

Because it is embodied as laminated, eddy currents can form in stator core 11 only to a very small extent even at fairly high movement speeds. The electric losses are reduced accordingly. The force-forming field build-up is moreover subject to a lesser delay as a result of stator 1 being laminated. The cylindrical linear motor can consequently be made more dynamic.

Stator 1 here has eighteen toroidal coils. Stator 1 can hence be used for a three-phase winding system. The coils of the winding system are spaced apart by the comb plate, which is to say stator core 11 having the slots, and positioned axially. The number of teeth on the comb plate is commensurate with the number of coils. An individual plate 12 accordingly consists of at least one tooth region having teeth 14 and one yoke region 13.

FIG. 3 shows a cylindrical stator 1 of an inventive linear motor. Stator core 11 is formed by the described plate arrangement having individual plates 12 arranged in a star shape. The plate arrangement or, as the case may be, stator core 11 is interrupted in the circumferential direction by a stator-comb element 17. The stator-comb element 17 is shown on its own in FIG. 4. Its radial height (referred to its condition when installed in cylindrical stator core 11) corresponds to that of stator core 11. The axial length of stator-comb element 17 here corresponds to that of an individual plate 12. The length of the comb element can, though, correspond also to that of a plurality of individual plates 12, or vice versa. The structure of stator-comb element 17 on the inside (again referred to its condition when installed in cylindrical stator core 11) corresponds substantially to that of a sector of stator core 11 or, as the case may be, the plate arrangement having an identical size. That means that stator-comb element 17 has the same geometrically shaped teeth 18 as the plate arrangement. The slots in the plate arrangement will accordingly not be interrupted by emplaced stator-comb element 17.

Stator-comb element 17 has on its outside a channel 19 extending under the outer casing of cylindrical stator 1. The connections between the individual coils can be established in the channel 19. Toroidal coils 10 can in that way be connected to each other in the axial direction without the need to increase the radial dimension of stator 1.

A stator-comb element 17 or plurality of stator-comb elements 17 of this type may be disposed along the circumference of stator 1 interrupting the stator core or, as the case may be, the plate arrangement at a single location or at several locations in the circumferential direction. The stator-comb element(s) 17 may be used not only for connecting toroidal coils 10 but generally for leading the winding terminals to the outside.

As can be seen in the front-side view in FIG. 5, a stator-comb element 17 has preferably the shape of a circular sector. Lateral areas 20 are accordingly radially oriented and serve simultaneously as contacts for the adjacent plates.

Insulating plastic is preferably used as the material for stator-comb elements 17. Stator-comb elements 17 can, though, also be cast or sintered parts. They will in that case have an electrically insulating layer on their surface.

The connections between the individual coils are preferably established using a prefabricated connecting block that is positioned in connector channel 19. Toroidal coils 10 are connected in such a way as to produce as low cogging forces as possible. According to FIG. 6, rotor 2 has eight poles and stator 1 thirty-six toroidal coils 10. The result is a basic winding (see curly bracket in FIG. 6) having toroidal coils 10, and the length of stator 1 is an integral multiple of the basic winding. In the present example, the basic winding is as long as the rotor 2 and the stator 1 is twice as long as the rotor 2.

Figure 6:
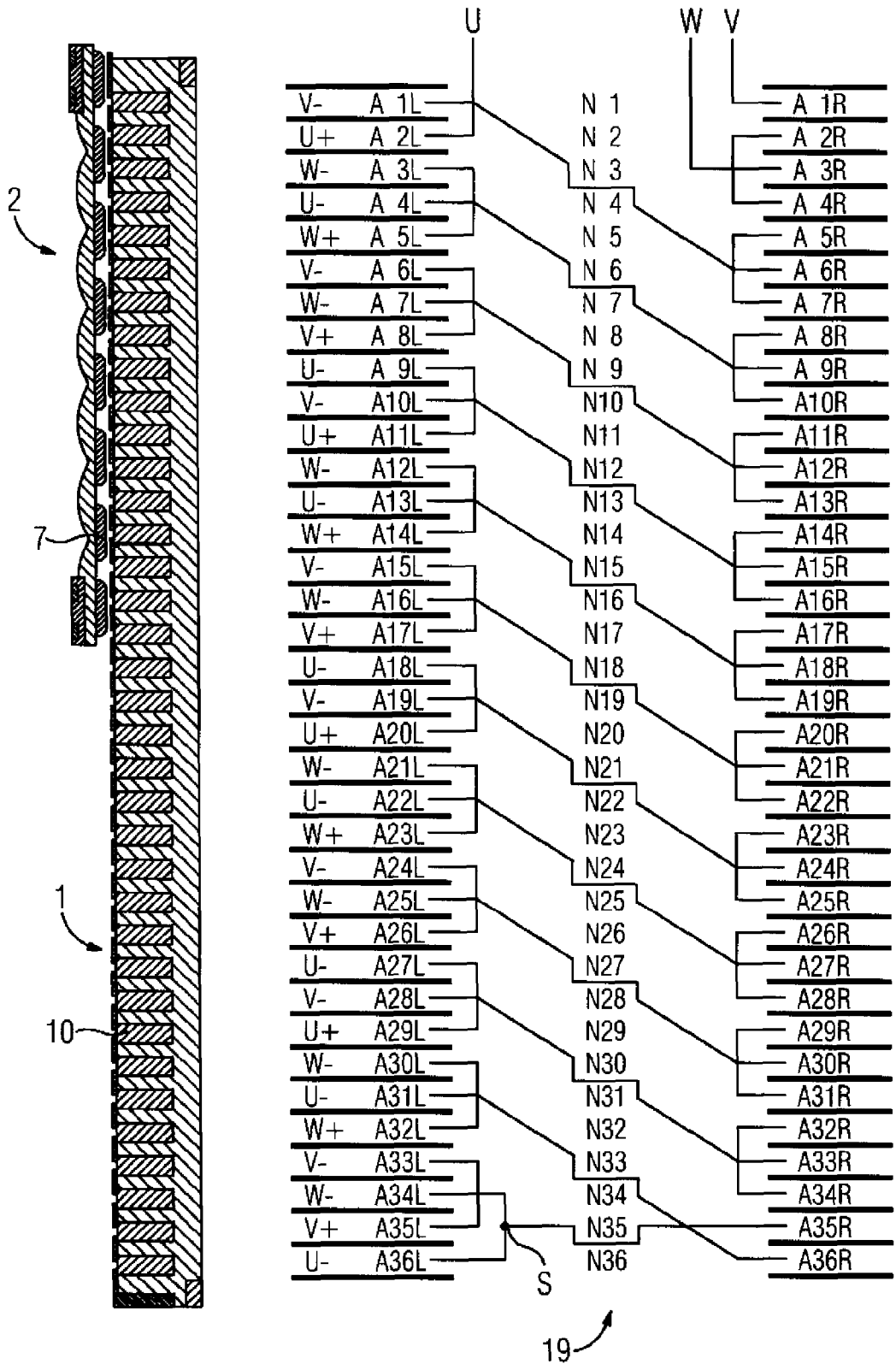
FIG. 6 is a top view of a connector channel of a stator of an inventive cylindrical linear motor.

As can be seen from FIG. 6, left-hand terminals A1L to A36L and right-hand terminals A1R to A36R project into connector channel 19. The respective terminals originate in the 36 toroidal coils 10 that have been inserted into slots N1 to N36. For example the coil in first slot N1 has the two mutually opposite terminals A1L and A1L. The phase V of the three-phase system is connected to terminal A1L. The current thus flows into terminal A1L, then through the coil, and exits at the end of the coil at terminal A1L. The flow of current from right-hand terminal A1L to left-hand terminal A1L is here symbolized by a minus sign (V−). The current produces a correspondingly oriented magnetic component.

The left-hand terminal A1L of the first toroidal coil is connected to the right-hand terminal A6R of the sixth toroidal coil. The current then flows through the sixth toroidal coil and at the end thereof out of the output of the sixth toroidal coil at terminal A6L. The terminal A6L is connected to terminal A8L so that the current will flow onward into the left-hand terminal A8L of the eighth toroidal coil. After flowing through the eighth toroidal coil, the current exits the eighth toroidal coil at terminal A8R. The current here flows from left-hand terminal A8L to right-hand terminal A8R and therefore has a plus sign (V+).

The other connections of the terminals can readily be seen in FIG. 6.

In the example shown in FIG. 6, the terminal A2L is connected to phase U and terminal A3R to phase W.

As can be seen in the lower part of FIG. 6, the coils in slots N34 to N36 are connected together at a star point S. Specifically, terminals A34L, A36L, and A35R are connected together at the star point S.

The comb structure of stator 1 having toroidal coils 10 can be seen on the left-hand side of FIG. 6. The rotor 2 extends across half the length of the stator 1. The maximum stroke of the linear motor thus corresponds to the length of the rotor 2. As mentioned above, the stroke can be increased by a multiple of the basic winding or, as the case may be, of the rotor length. For example, when the stroke is to be increased by one rotor length, additional eighteen toroidal coils 10 will have to be provided on the stator 1. The coils in the slots from slot N34 to slot N51 are then connected according to the same scheme as a corresponding number of coils from slot N4 to slot N33. The star point will then be formed by the coils in slots N52, N53, and N54. The linear motor can in a similar way also be extended by twice, three times etc. the basic winding.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A cylindrical linear motor, comprising:
   a cylindrical rotor having eight poles, and
   a cylindrical stator comprising a winding having 36 coaxial toroidal coils of equal size forming a first basic winding and extending in a circumferential direction of the stator, with the toroidal coils arranged axially one behind the other, said stator having an axial connector channel,
   wherein each toroidal coil has a left-hand terminal and a right-hand terminal located in the connector channel, with the left-hand terminals being connected to the right-hand terminals as follows:

$A(n*3+1)L$ to $A(n*3+6)R$, with the left-hand terminals being connected to the right-hand terminals AiR as follows:

$A(n*3+3)L$ to $A(n*3+5)L$, and with the right-hand terminals being connected to the right-hand terminals as follows:

$A(n*3+2)R$ to $A(n*3+4)R$, wherein A(i)L indicates the i-th left-hand terminal, A(i)R indicates the i-th right-hand terminal, and n=0 . . . 10 for all terminals, and
   wherein the terminals A2L, A1L, and A3R are each connected to a corresponding phase of a three-phase system, and the terminals A34L, A36L, and A35R are connected together at a star point.

2. The cylindrical linear motor of claim 1, wherein the stator is axially extended at a center of the stator by at least one additional basic winding comprising eighteen coaxial toroidal coils, with terminals of the toroidal coils of the additional basic winding being connected commensurate with the connection of the first basic winding.

3. The cylindrical linear motor of claim 1, wherein the stator comprises radially arranged individual plates.

4. The cylindrical linear motor of claim 1, wherein the stator comprises a stator core with slots extending in the circumferential direction, and wherein the toroidal coils are inserted in the slots.

5. The cylindrical linear motor of claim 3, wherein the individual plates form a plate arrangement having one or more interruptions in the circumferential direction, and further comprising a stator-comb element inserted in an interruption in one-to-one correspondence.

6. The cylindrical linear motor of claim 5, wherein the axially extending connector channel is disposed in the stator-comb element.

7. The cylindrical linear motor of claim 5, wherein the stator-comb element comprises an electrically insulating plastic part, an electrically insulating cast part, or an electrically insulating sintered part.

8. The cylindrical linear motor of claim 1, wherein the terminals are connected with insulation-displacement connectors or soldered joints.

9. A combination drive, comprising:
   a torque motor for performing a rotating motion; and
   a cylindrical linear motor for performing a stroke motion, said linear motor having a cylindrical rotor having eight poles, and a cylindrical stator comprising a winding having 36 coaxial toroidal coils of equal size forming a first, basic winding and extending in a circumferential direction of the stator, with the toroidal coils arranged axially one behind the other, said stator having an axial connector channel, wherein each toroidal coil has a left-hand terminal and a right-hand terminal located in the connector channel, with the left-hand terminals being connected to the right-hand terminals AiR as follows:

$A(n*3+1)L$ to $A(n*3+6)R$, with the left-hand terminals being connected to the left-hand terminals as follows:

$A(n*3+3)L$ to $A(n*3+5)L$, and with the right-hand terminals being connected to the right-hand terminals as follows:

$A(n*3+2)R$ to $A(n*3+4)R$, wherein $A(i)L$ indicates the i-th left-hand terminal, $A(i)R$ indicates the i-th right-hand terminal, and n=0 . . . 10 for all terminals, and wherein the terminals A2L, A1L, and A3R are each connected to a corresponding phase of a three-phase system, and the terminals A34L, A36L, and A35R are connected together at a star point.

10. The combination drive of claim 9, wherein the stator is axially extended at a center of the stator by at least one additional basic winding comprising eighteen coaxial toroidal coils, with terminals of the toroidal coils of the additional basic winding being connected commensurate with the connection of the first basic winding.

11. The combination drive of claim 9, wherein the stator comprises radially arranged individual plates.

12. The combination drive of claim 9, wherein the stator comprises a stator core with slots extending in the circumferential direction, and wherein the toroidal coils are inserted in the slots.

13. The combination drive of claim 11, wherein the individual plates form a plate arrangement having one or more interruptions in the circumferential direction, and further comprising a stator-comb element inserted in an interruption in one-to-one correspondence.

14. The combination drive of claim 13, wherein the axially extending connector channel is disposed in the stator-comb element.

15. The combination drive of claim 13, wherein the stator-comb element comprises an electrically insulating plastic part, an electrically insulating cast part, or an electrically insulating sintered part.

16. The combination drive of claim 9, wherein the terminals are connected with insulation-displacement connectors or soldered joints.

* * * * *

UNITED STATES PATENT AND TRADEMARK OFFICE
CERTIFICATE OF CORRECTION

PATENT NO. : 8,853,894 B2  
APPLICATION NO. : 13/469263  
DATED : October 7, 2014  
INVENTOR(S) : Michael Fick et al.

Page 1 of 1

It is certified that error appears in the above-identified patent and that said Letters Patent is hereby corrected as shown below:

In the Claims

In column 6, claim 1, line 17: please delete "AiR".
In column 6, claim 1, line 27: please replace "A1L" with "A1R".
In column 7, claim 9, line 4: please delete "AiR".
In column 7, claim 9, line 17: please replace "A1L" with "A1R".

Signed and Sealed this
Twenty-eighth Day of April, 2015

Michelle K. Lee
*Director of the United States Patent and Trademark Office*